United States Patent
Shimada et al.

Patent Number: 5,982,523
Date of Patent: Nov. 9, 1999

[54] TILT CORRECTING OPTICAL SYSTEM

[75] Inventors: Katsumi Shimada; Masaru Noguchi, both of Kanagawa-ken, Japan

[73] Assignee: Fuji Photo Film Co., Ltd., Kanagawa-ken, Japan

[21] Appl. No.: 09/001,923

[22] Filed: Dec. 31, 1997

[30] Foreign Application Priority Data

Jan. 10, 1997 [JP] Japan .................................... 9-002737

[51] Int. Cl.$^6$ .................................................. G02B 26/08
[52] U.S. Cl. .......................... 359/206; 359/205; 359/207; 359/208; 359/216
[58] Field of Search ........................... 359/205, 207–208, 359/206

[56] References Cited

FOREIGN PATENT DOCUMENTS 61-289318  12/1986  Japan ...................................... 359/208

*Primary Examiner*—James Phan
*Attorney, Agent, or Firm*—Sughrue, Mion, Zinn, Macpeak & Seas, PLLC

[57] ABSTRACT

In a light beam scanning system, a light beam deflected by a deflector is focused to form an image on a surface and the image is caused to scan the surface at a constant speed. A tilt correcting optical system for compensating for surface tilt in the deflector includes an optical element which is disposed between the deflector and the surface to be scanned and reflects the light beam, deflected by the deflector, to converge on the surface in a direction perpendicular to the direction in which the image scans the surface. The optical element is an in-mirror lens which has a refracting surface at its front face and has a reflecting surface at its rear end face. The refracting surface and the reflecting surfaces are both cylindrical and concave toward the deflector and the radius of curvature of the refracting surface is smaller than that of the reflecting surface.

2 Claims, 4 Drawing Sheets

MAIN SCANNING LINE

TILT CORRECTING OPTICAL SYSTEM

BACKGROUND OF THE INVENTION

1. Field of the Invention

This invention relates to a tilt correcting optical system for use in a light beam scanning system which deflects a light beam such as a laser beam to scan a surface, and more particularly to a tilt correcting optical system which is used in a light beam scanning system, in which a light beam is deflected by a deflector such as a rotating polygonal mirror to scan a surface, and corrects fluctuation in the scanning line spacing generated due to surface tilt in the deflector.

2. Description of the Related Art

There have been well known light beam scanning systems in which a light beam is deflected by a deflector such as a rotating polygonal mirror or a galvanometer mirror to scan a surface.

In such light beam scanning systems, there has been a problem that the position of the scanning spot fluctuates in the sub-scanning direction (a direction normal to the main scanning direction) on the surface to be scanned, which results in fluctuation in the scanning line spacing. In the case of a rotating polygonal mirror, error in parallelism of each reflecting surface relative to the rotation axis due to manufacturing accuracy causes the phenomenon, and in the case of a galvanometer mirror, wobbling of the mirror causes the phenomenon. In this specification, the error in parallelism of the reflecting surfaces and the wobbling of the galvanometer mirror will be referred to as "surface tilt", hereinbelow.

It has been known that the surface tilt can be compensated for by use of a tilt correcting optical system comprising a positive cylindrical lens or a cylindrical mirror.

However recently, scanning with a higher accuracy at a higher density has come to be required and compensation for the surface tilt must be effected with a higher accuracy. It is difficult to compensate for the surface tilt with a higher accuracy just with a cylindrical lens or a cylindrical mirror.

Thus there has been proposed in Japanese Patent Publication No. 4(1992)-21164 a tilt correcting optical system comprising a combination of a negative cylindrical lens and a positive cylindrical mirror. An example of such a tilt correcting optical system will be described with reference to FIGS. 5 and 6, hereinbelow.

In FIGS. 5 and 6, a light beam L emitted from a laser 111 passes through a cylindrical lens 112 and is focused on a reflecting surface 114 of a rotating polygonal mirror 113 as a line image perpendicular to the axis of rotation of the polygonal mirror 113. As the polygonal mirror 113 rotates in the direction of arrow R, the light beam L is deflected. FIG. 5 shows the optical path of the deflected light beam L as seen in a direction parallel to the axis of rotation of the polygonal mirror 113 and FIG. 6 shows the same as seen in a direction perpendicular to the axis of rotation of the polygonal mirror 113. The main scanning of the deflected light beam L will be described first with reference to FIG. 5, hereinbelow. The light beam L reflected and deflected by the reflecting surface 114 of the rotating polygonal mirror 113 enters a scanning lens 115. The parallel light beam L further passes through a negative cylindrical lens 116 and impinges upon a positive cylindrical mirror 117 to be converged on a surface to be scanned 120. Thus the light beam L is caused to repeatedly scan (the main scanning) the surface 120 in the direction of arrow X. The negative cylindrical lens 116 and the positive cylindrical mirror 117 disposed between the scanning lens 115 and the surface 120 to extend in parallel to the main scanning direction respectively diverge and converge the light beam L only in a direction perpendicular to the main scanning direction (the sub-scanning direction), and accordingly the light beam L just passes through the negative cylindrical lens 116 and is just reflected by the positive cylindrical mirror 117 as seen in FIG. 5. As described above, the rotating polygonal mirror 113 is apt to generate surface tilt and how the surface tilt is compensated for will be described hereinbelow with reference to FIG. 6.

The light beam L reflected and deflected by the reflecting surface 114 of the rotating polygonal mirror 113 is somewhat diverged by the scanning lens 115. Then the diverged light beam L impinges upon the positive cylindrical mirror 117 which converges the light beam L only in the sub-scanning direction (the direction of arrow Y) on the surface 120 to be scanned. At this time, the cylindrical mirror 117 converges light reflected by a point on the reflecting surface 114 in the same position on the surface 120 as seen along the sub-scanning direction irrespective of the surface tilt of the polygonal mirror 113. That is, even if the optical path of the light beam L reflected by the polygonal mirror 113 deviates in the vertical direction as seen in FIG. 6, the deviation can be compensated for by the cylindrical mirror 117. The cylindrical lens 117 between the scanning lens 115 and the cylindrical mirror 117 corrects the curvature of field.

With such a tilt correcting optical system, the surface tilt can be compensated for at a higher accuracy than when the surface tilt is compensated for just by a positive cylindrical lens or a cylindrical mirror. However the arrangement of the tilt correcting optical system described above increases the number of parts, which leads to increase in the cost and at the same time leads to increase in the accumulated error in assembly of the parts.

SUMMARY OF THE INVENTION

In view of the foregoing observations and description, the primary object of the present invention is to provide a tilt correcting optical system which can compensate for the surface tilt of the deflector at a high accuracy with a limited number of parts.

In accordance with the present invention, there is provided a tilt correcting optical system for a light beam scanning system in which a light beam deflected by a deflector is focused to form an image on a surface and the image is caused to scan the surface at a constant speed, which tilt correcting optical system comprises an optical element which is disposed between the deflector and the surface to be scanned and reflects the light beam, deflected by the deflector, to converge on said surface in a direction perpendicular to the direction in which the image scans the surface, wherein the optical element is an in-mirror lens.

The in-mirror lens is an optical element which has a refracting surface at its front face and has a reflecting surface at its rear end face.

It is preferred that the refracting surface and the reflecting surfaces both be cylindrical surfaces concave toward the deflector with respect to incident light and the radius of curvature of the refracting surface be smaller than that of the reflecting surface.

In the tilt correcting optical system of the present invention, since an in-mirror lens is employed as the optical element for reflecting the light beam to converge on said surface in the sub-scanning direction, the surface tilt can be compensated for a higher accuracy by the tilt correcting optical system of the present invention than by tilt correcting optical systems where a cylindrical lens or a cylindrical mirror is employed alone.

Further since the in-mirror lens is a single element, the light beam scanning system can be smaller in the number of parts than when the surface tilt is compensated for by a combination of a cylindrical lens and a cylindrical mirror, whereby accumulated error in assembly of the parts can be smaller.

When an in-mirror lens having a concave cylindrical refracting surface and a concave cylindrical reflecting surfaces is employed, the power of the in-mirror lens as a whole is weak since the refracting surface is negative and the reflecting surface is positive. Since the sensitivity to error generally increases as the power increases, deterioration in performance can be suppressed by use of a weak power element.

DESCRIPTION OF THE PREFERRED EMBODIMENT

Figure 1:
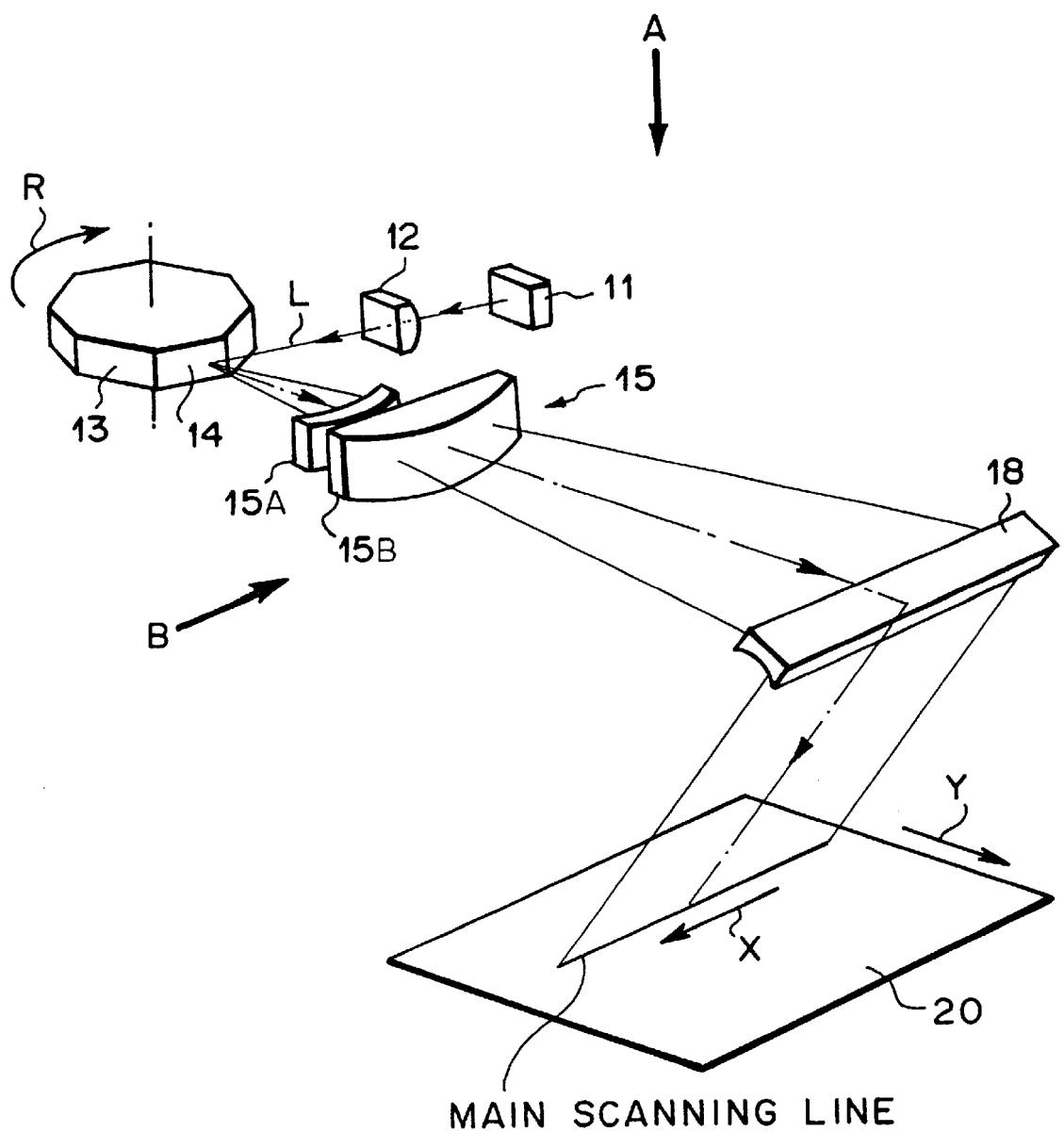
FIG. 1 is a schematic perspective view of a light beam scanning system provided with a tilt correcting optical system in accordance with an embodiment of the present invention.
Figure 2:
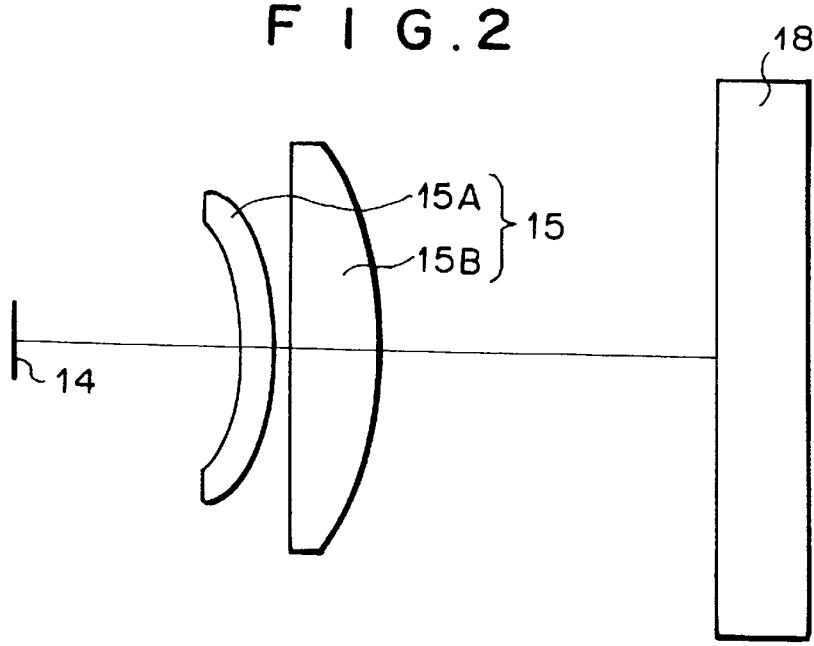
FIG. 2 is a view showing part of the optical system of the light beam scanning system shown in FIG. 1 including the tilt correcting optical system as seen in the direction of arrow A in FIG. 1.

In FIG. 1, a light beam scanning system comprising a laser 11 emitting a laser beam L, a cylindrical lens 12 which forms a line image of the laser beam L on a reflecting (deflecting) surface 14 of a polygonal mirror 13 which is rotated by a motor (not shown) to deflect in a predetermined direction the laser beam L impinging upon the reflecting surface 14, an fθ lens system 15 (first and second fθ lenses 15A and 15B) which focuses the deflected laser beam L on a photosensitive material 20 and causes the laser beam L to scan the photosensitive material 20 in a main scanning direction X at a constant speed, and an in-mirror lens 18 which reflects the laser beam L passing through the fθ lens system 15 toward the photosensitive material 20 and has a refractive power for compensating for surface tilt of the polygonal mirror 13 in a sub-scanning direction Y perpendicular to the main scanning direction X. The in-mirror lens 18 has a concave cylindrical refracting surface 18a (FIGS. 3A and 3B) and a concave cylindrical reflecting surface 18b, and is arranged to compensate for the surface tilt by the refracting surface 18a and the reflecting surface 18b. The radius of curvature of the refracting surface 18a is smaller than that of the reflecting surface 18b.

The photosensitive material 20 is conveyed in the sub-scanning direction Y by a conveyor means (not shown).

The operation of the light beam scanning system will be described, hereinbelow.

The laser beam L emitted from the laser 11 is focused as a line image on the reflecting surface 14 of the polygonal mirror 13 by the cylindrical lens 12.

The laser beam L deflected by the reflecting surface 14 passes through the fθ lens system 15 and is refracted and reflected by the in-mirror lens 18 to form a scanning spot on the surface of the photosensitive material 20. Since the polygonal mirror 13 is rotated at a high speed in the direction of arrow R, the scanning spot repeatedly scans the surface of the photosensitive material 20 in the main scanning direction X while the photosensitive material 20 is conveyed in the sub-scanning direction Y, whereby the scanning spot two-dimensionally scans the surface of the photosensitive material 20.

More specifically, the laser beam L deflected by the reflecting surface 14 of the polygonal mirror 13 is caused to scan the surface of the photosensitive material 20 at a constant speed by the fθ lens system 15. At this time, the direction of the laser beam L fluctuates in the sub-scanning direction Y due to the surface tilt of the reflecting surface 14 of the polygonal mirror 13. The fluctuation in the direction of the laser beam L is corrected while the laser beam L is refracted by the refracting surface 18a and reflected by the reflecting surface 18b and then emanates through the refracting surface 18a by the diverging effect of the refracting surface 18a and the converging effect of the reflecting surface 18b, whereby the surface tilt of the reflecting surface 14 can be compensated for at a high accuracy.

Thus in the tilt correcting optical system of this embodiment, a highly accurate tilt correction can be realized without increasing the number of parts by using the in-mirror lens 18 which has both the effects of a cylindrical lens and a cylindrical mirror.

Figure 3A:
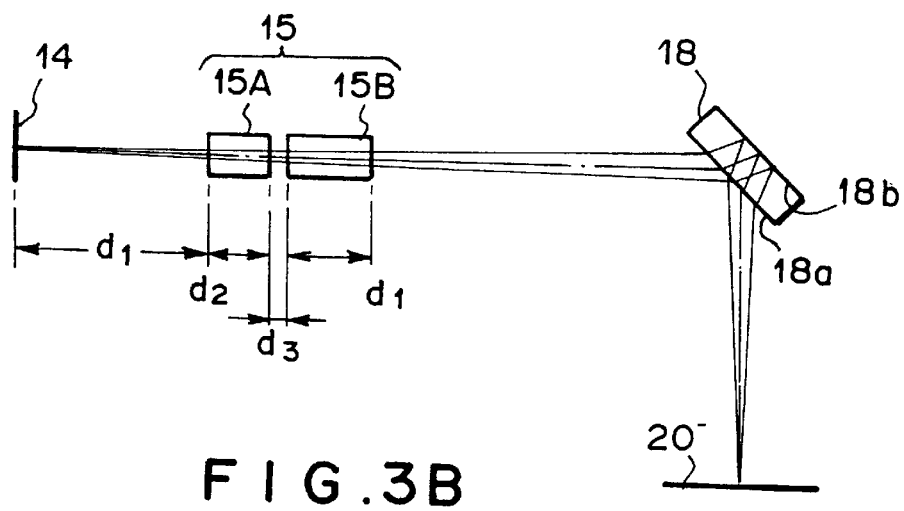
FIG. 3A is a view showing the part of the optical system as seen in the direction of arrow B in FIG. 1.
Figure 3B:
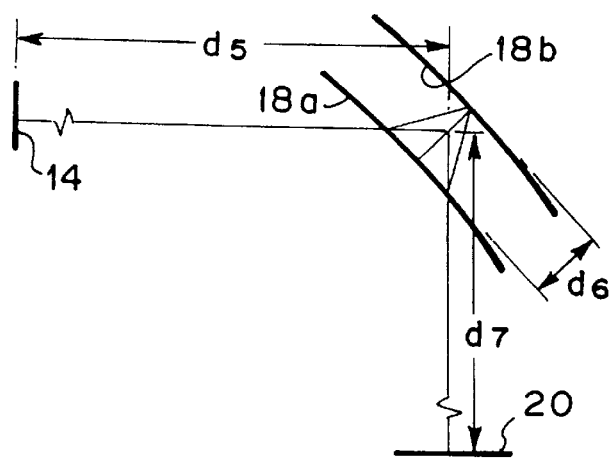
FIG. 3B is an enlarged view of the in-mirror lens.

A concrete example of the optical system of the embodiment described above is shown in table 1. In table 1, the numbers in the leftmost column designate the surfaces as numbered from the reflecting surface 14. That is, No. 1 to No. 7 respectively designate the reflecting surface 14, the front and rear end faces of the first fθ lens 15A, the front and rear end faces of the second fθ lens 15B, and the refracting surfaces 18a and the reflecting surface 18b of the in-mirror lens 18. IMG denotes the surface of the photosensitive material 20. The axial surface separations dn (n=1 to 7) are as shown in FIGS. 3A and 3B. The refractive indexes $n_d$ are for the sodium d-line. The radius of curvature R is associated with a positive number when the center of curvature is positioned downstream of the surface and with a negative number when the center of curvature is positioned upstream of the surface.

TABLE 1

| No. | R(mm) | dn(mm) | $n_d$ |
| --- | --- | --- | --- |
| 1 | ∞ | 38.000 | |
| 2 | −105.513 | 15.000 | 1.53029 |
| 3 | −106.424 | 5.000 | |
| 4 | ∞ | 32.000 | 1.62004 |
| 5 | −140.591 | 89.012 | |
| 6 | −117.43867 | 10.000 | 1.51680 |
| 7 | −163.73940 | 129.461 | |
| IMG | ∞ | | | focal length: 209.772 mm
scanning width: 352 mm
scanning angle: 96°

Figure 4B:
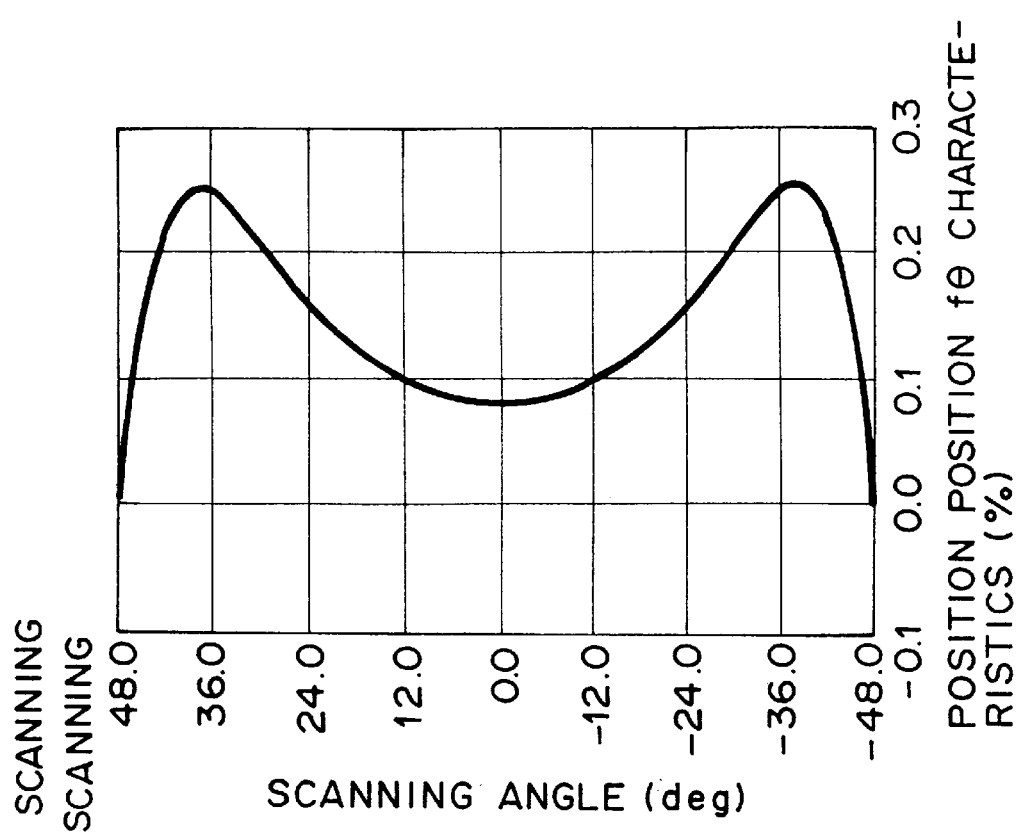
FIGS. 4A and 4B show aberrations in an example of a light beam scanning system provided with a tilt correcting optical system in accordance the present invention.
Figure 4A:
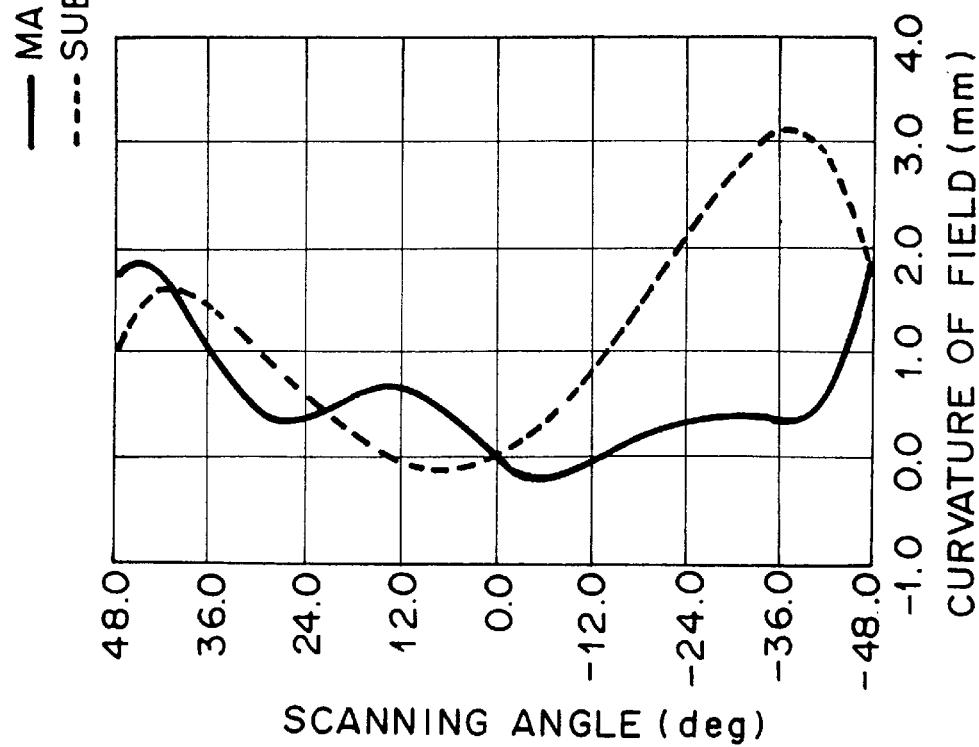
Figure 5:
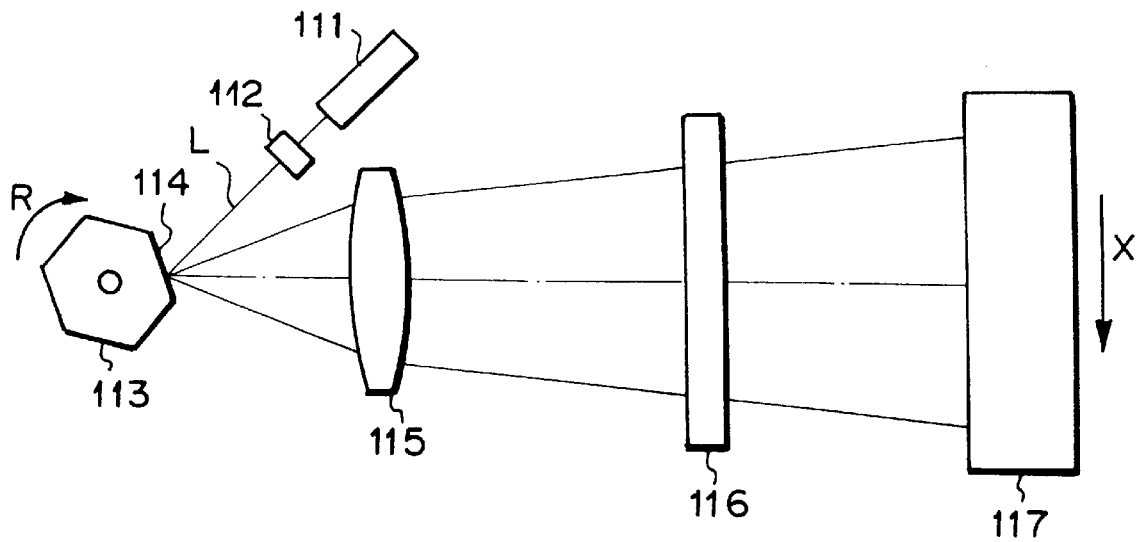
FIG. 5 is a schematic view showing the optical path of the light beam L in a conventional light beam scanning system as seen in a direction parallel to the axis of rotation of the deflector.
Figure 6:
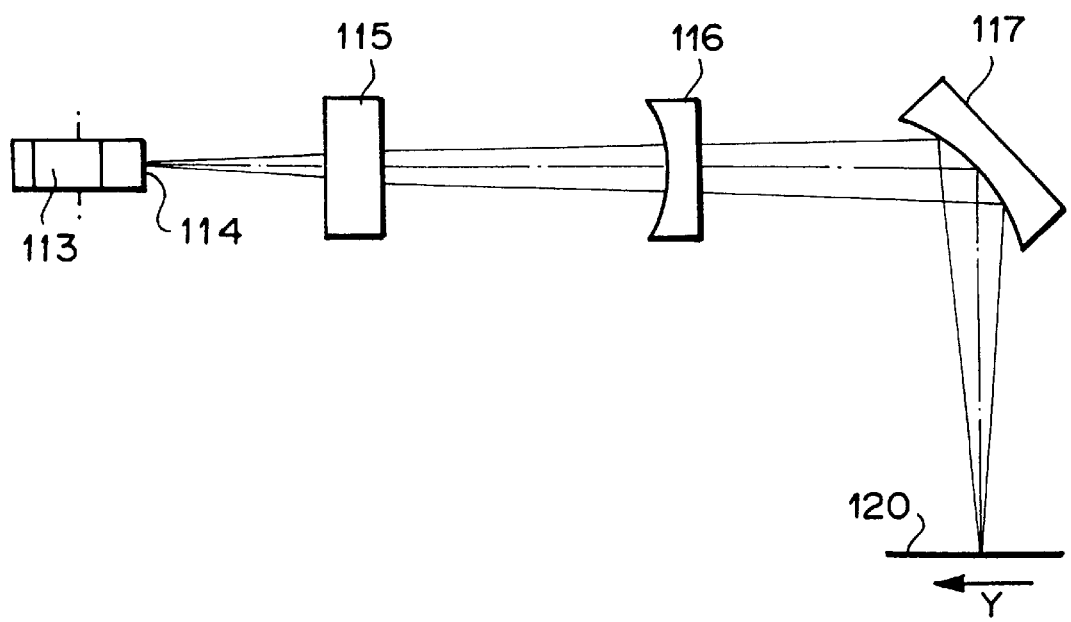
FIG. 6 is a schematic view showing the optical path of the light beam L in the conventional light beam scanning system as seen in a direction perpendicular to the axis of rotation of the deflector.

The curvature of field characteristics and the fθ characteristics of the optical system shown in table 1 are shown in FIGS. 4A and 4B. As can be understood from FIGS. 4A and 4B, the optical system is well corrected in abberations.

What is claimed is:

1. A tilt correcting optical system for a light beam scanning system in which a light beam deflected by a deflector is focused to form an image on a surface, said tilt correcting optical system comprising:

an Fθ lens system disposed between the deflector and the surface to be scanned, which focuses the deflected light beam to scan the surface at a constant speed, and an optical element which is disposed between the Fθ lens system and the surface to be scanned and reflects the light beam, deflected by the deflector and passed through the Fθ lens system, to converge on the surface in a direction perpendicular to the direction in which the light beam scans the surface, to correct for a tilt in a reflecting surface of the deflector, wherein said optical element is an in-mirror lens.

2. A tilt correcting optical system as defined in claim 1, in which the in-mirror lens has a refracting surface at its front face and has a reflecting surface at its rear end face, the refracting surface and the reflecting surface both being cylindrical and concave toward the deflector and a radius of curvature of the refracting surface being smaller than that of a radius of curvature of the reflecting surface.

* * * * *